(12) United States Patent
Mukherjee et al.

(10) Patent No.: US 11,436,134 B2
(45) Date of Patent: Sep. 6, 2022

(54) METHOD AND APPARATUS FOR DATA INTEGRATION FRAMEWORK

(71) Applicant: JPMorgan Chase Bank, N.A., New York, NY (US)

(72) Inventors: Vivek Mukherjee, New York, NY (US); Chia-Ling Wang, Warrren, NJ (US); David Fu, Monmouth Junction, NJ (US); Rajeswari Karuppasamy, Jersey City, NJ (US); Tara J Paider, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 245 days.

(21) Appl. No.: 16/924,732

(22) Filed: Jul. 9, 2020

(65) Prior Publication Data

US 2022/0012170 A1      Jan. 13, 2022

(51) Int. Cl.
*G06F 9/44*     (2018.01)
*G06F 11/36*    (2006.01)
*G06F 16/28*    (2019.01)

(52) U.S. Cl.
CPC ...... *G06F 11/3692* (2013.01); *G06F 11/3688* (2013.01); *G06F 11/3696* (2013.01); *G06F 16/283* (2019.01)

(58) Field of Classification Search
CPC ............. G06F 11/3692; G06F 11/3688; G06F 11/3696; G06F 16/283
See application file for complete search history.

(56) References Cited

U.S. PATENT DOCUMENTS

| | | | | |
|---|---|---|---|---|
| 2014/0114907 | A1* | 4/2014 | Kozina | G06F 16/283 |
| | | | | 707/602 |
| 2015/0317328 | A1* | 11/2015 | Chhaunker | G06F 16/162 |
| | | | | 707/692 |
| 2020/0151038 | A1* | 5/2020 | Lingamneni | G06F 8/31 |
| 2020/0285903 | A1* | 9/2020 | Rogers | G06N 20/00 |

\* cited by examiner

*Primary Examiner* — Chat C Do
*Assistant Examiner* — Lenin Paulino
(74) *Attorney, Agent, or Firm* — Greenblum & Bernstein, P.L.C.

(57) ABSTRACT

Various methods, apparatuses/systems, and media for integrating data are provided. A processor implements a data processing framework configured to run native on a big data platform and abstracts data processing constructs to a user friendly template, thereby eliminating necessity of user initiated tasks of instantiating language level objects. The processor also implements a core set of data pipeline configurations on the template configured to initiate a chain of user defined data transformations. A receiver operatively connected with the processor via a communication network receives input of the chain of the user defined data transformations. The processor tests each transformation independently of each other and outputs data integration solutions on the big data platform based on a positive test result.

19 Claims, 8 Drawing Sheets

METHOD AND APPARATUS FOR DATA INTEGRATION FRAMEWORK

TECHNICAL FIELD

This disclosure generally relates to data processing, and, more particularly, to methods and apparatuses for implementing a data integration framework module for providing a core set of data pipeline capabilities configured to initiate a chain of user or developer defined data transformations.

BACKGROUND

Data integration and data management may be of importance for an organization, such as J. P. Morgan and Chase (JPMC). JPMC, especially in the Consumer Bank, often deploys myriad proprietary ETL (extract-transform-load) tools to develop data warehousing assets. These tools may also be largely code generators which may not be open systems creating captive audience situation and vendor lock-in, which yields multiple millions of dollars of licensing spend for the organization. Many of these tools are often not aligned with an application toolchain perpetuating quality assurance scenarios affecting developer productivity and legacy rationalization and modernization adversely.

SUMMARY

The present disclosure, through one or more of its various aspects, embodiments, and/or specific features or sub-components, may provide, among others, various systems, servers, devices, methods, media, programs, and platforms for implementing a data integration framework module for providing a core set of data pipeline capabilities configured to initiate a chain of user or developer defined data transformations, thereby increasing developer productivity when writing big data native data integration solutions by accelerating and improving time to market and augmenting developer skills and replacing vendor based data processing product with an organic capability, but the disclosure is not limited thereto.

According to an aspect of the present disclosure, a method for integrating data by utilizing one or more processors and one or more memories is disclosed. The method may include: implementing a data processing framework configured to run native on a big data platform; abstracting data processing constructs to a user friendly template, thereby eliminating necessity of user initiated tasks of instantiating language level objects; implementing a core set of data pipeline configurations on the template configured to initiate a chain of user defined data transformations; receiving input of the chain of the user defined data transformations; testing each transformation independently of each other; and outputting data integration solutions on the big data platform based on a positive test result.

According to another aspect of the present disclosure, wherein the big data platform may be a framework that may be configured for distributed processing of large data sets across clusters of computers using simple programming models.

According to yet another aspect of the present disclosure, the method may further include: implementing code data transformation services as part of the data processing framework.

According to further aspect of the present disclosure, wherein the data processing framework may be configured to be deployed across multiple storage layers, but the disclosure is not limited thereto.

According to an additional aspect of the present disclosure, wherein the data processing framework may be a standalone product having standalone library configured to be deployed across multiple storage layers, but the disclosure is not limited thereto.

According to another aspect of the present disclosure, wherein the data processing framework may be Java deployable.

According to yet another aspect of the present disclosure, the method may further include: implementing an abstraction layer on the data processing framework; receiving a master file and subsequently receiving a new file; generating data corresponding to a delta value from a difference between the master file and the new file based on predefined parameters; receiving input for applying data processing functions on the generated data corresponding to the delta value; and outputting data integration solutions on the big data platform based on the data processing functions.

According to an additional aspect of the present disclosure, the method may further include: dividing the data processing framework into one or more of the following transformations: root transformation, foundational transformation, specialized transformation, and custom transformation; and testing each transformation independently of each other.

According to another aspect of the present disclosure, wherein the data processing framework may include a data processing core framework that is configured to access an audit service and an extension service to generate the data integration solutions as data transformation results.

According to yet another aspect of the present disclosure, wherein the audit service may include one or more of the following services: pipeline error handling service, logging service, and exception handling service, but the disclosure is not limited thereto.

According to a further aspect of present disclosure, the extension service may include one or more of the following services: utility services, security service, validation service, portal component and rules engine component, but the disclosure is not limited thereto.

According to an additional aspect of the present disclosure, wherein the data processing core framework may be configured to: access a pipeline component that is configured to receive data from a data lineage service component and a data flow component; and output data to a schema management service component and a transform component.

According to a further aspect of the present disclosure, wherein the transform component may include one or more of the following transformation component: root transformation component, foundational transformation component, specialized transformation component, and custom transformation component, but the disclosure is not limited thereto.

According to yet another aspect of the present disclosure, wherein for all functions, the method may further include: generating an empty template of user acceptance testing; abstracting domain specific language in SQL (structured query language) corresponding to the testing; and writing all codes within the template based on the abstracted domain specific language.

According to another aspect of the present disclosure, a system for integrating data is disclosed. The system may include a memory and a processor operatively connected to the memory via a communication network. The processor may be configured to: implement a data processing framework configured to run native on a big data platform; abstract data processing constructs to a user friendly template, thereby eliminating necessity of user initiated tasks of instantiating language level objects; implement a core set of data pipeline configurations on the template configured to initiate a chain of user defined data transformations; receive input of the chain of the user defined data transformations; test each transformation independently of each other; and output data integration solutions on the big data platform based on a positive test result.

According to further aspect of the present disclosure, the processor may be further configured to: divide the data processing framework into one or more of the following transformations: root transformation, foundational transformation, specialized transformation, and custom transformation; and test each transformation independently of each other.

According to yet another aspect of the present disclosure, the processor may be further configured to: access a pipeline component that is configured to receive data from a data lineage service component and a data flow component; and output data to a schema management service component and a transform component, wherein the transform component includes one or more of the following transformation component: root transformation component, foundational transformation component, specialized transformation component, and custom transformation component, but the disclosure is not limited thereto.

According to an additional aspect of the present disclosure, the processor may be further configured to: generate an empty template of user acceptance testing; abstract domain specific language in SQL (structured query language) corresponding to the testing; and write all codes within the template based on the abstracted domain specific language.

According to yet another aspect of the present disclosure, the processor may be further configured to: implement an abstraction layer on the data processing framework; receive a master file and subsequently receiving a new file; generate data corresponding to a delta value from a difference between the master file and the new file based on predefined parameters; receive input for applying data processing functions on the generated data corresponding to the delta value; and output data integration solutions on the big data platform based on the data processing functions.

According to another aspect of the present disclosure, a non-transitory computer readable medium configured to store instructions for integrating data is disclosed. The instructions, when executed, may cause a processor to perform the following: implementing a data processing framework configured to run native on a big data platform; abstracting data processing constructs to a user friendly template, thereby eliminating necessity of user initiated tasks of instantiating language level objects; implementing a core set of data pipeline configurations on the template configured to initiate a chain of user defined data transformations; receiving input of the chain of the user defined data transformations; testing each transformation independently of each other; and outputting data integration solutions on the big data platform based on a positive test result.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
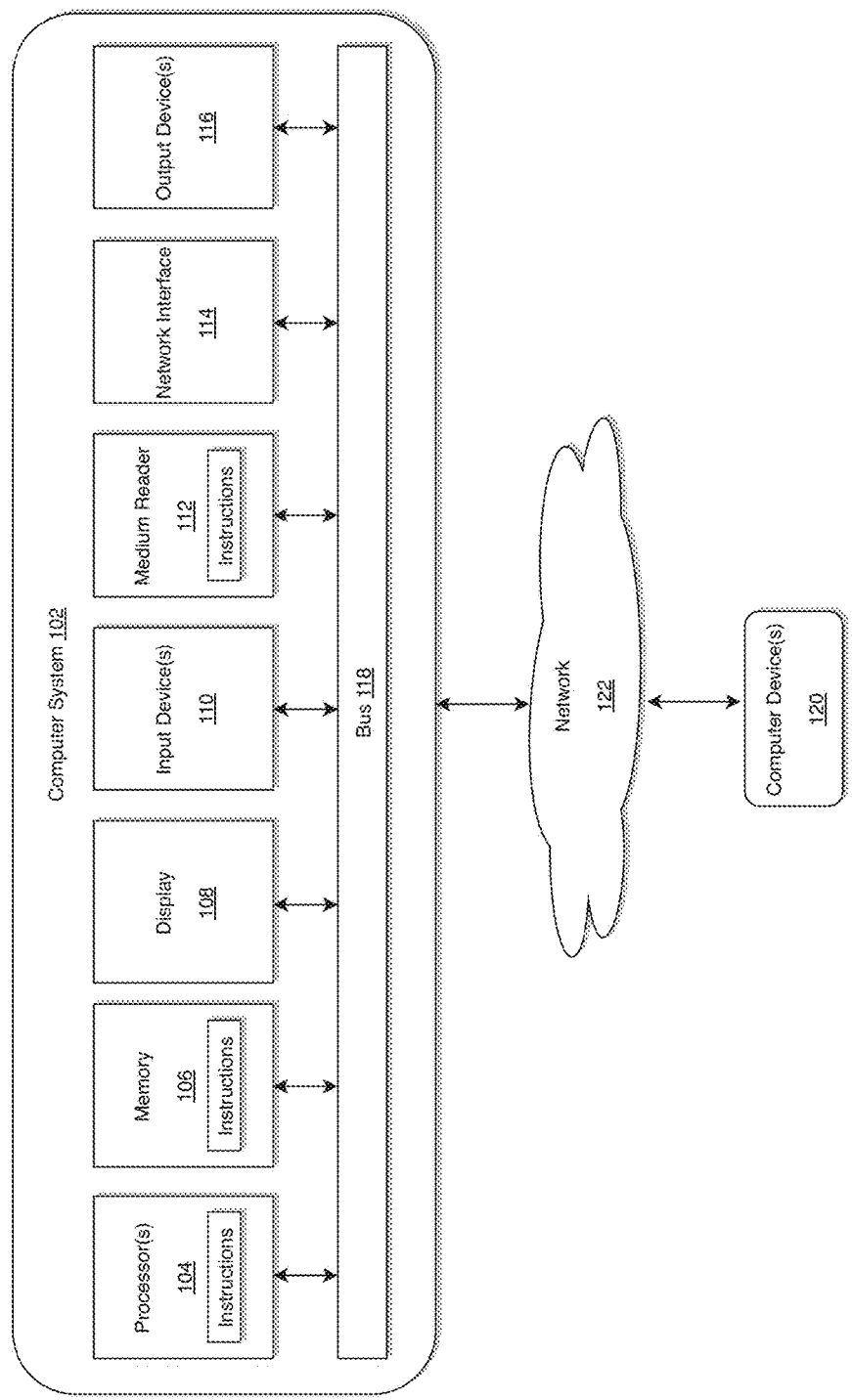
FIG. 1 illustrates a computer system for implementing a data integration framework device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized processes of implementing a data integration framework module for providing a core set of data pipeline capabilities configured to initiate a chain of user or developer defined data transformations, thereby increasing developer productivity when writing big data native data integration solutions by accelerating and improving time to market and augmenting developer skills and replacing vendor based data processing product with an organic capability, but the disclosure is not limited thereto.

Figure 2:
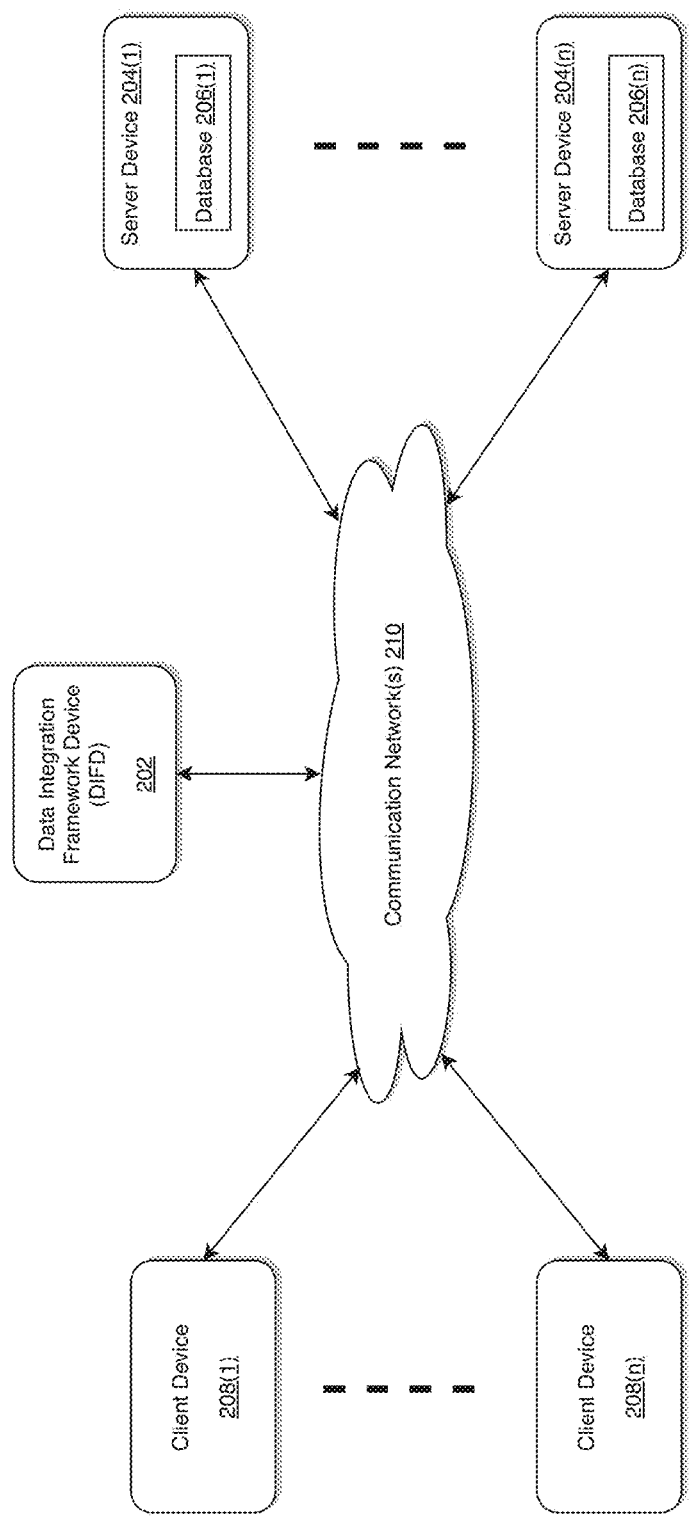
FIG. 2 illustrates an exemplary diagram of a network environment with a data integration framework device in accordance with an exemplary embodiment.

Referring to FIG. 2, a schematic of an exemplary network environment 200 for implementing a data integration framework device (DIFD) of the instant disclosure is illustrated.

According to exemplary embodiments, the above-described problems associated with conventional system may be overcome by implementing a DIFD 202 having a data integration framework module as illustrated in FIG. 2 by abstracting data processing constructs to developer friendly templates to accelerate development addressing key data integration architecture patterns and archetype (such as ETL, ELT (extract-load-transform), ETLT (extract-transform-load-transform), streaming and lambda, etc.) with new and native development technology stacks, but the disclosure is not limited thereto.

The DIFD 202 may be the same or similar to the computer system 102 as described with respect to FIG. 1.

The DIFD 202 may store one or more applications that can include executable instructions that, when executed by the DIFD 202, cause the DIFD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DIFD 202 itself, may be located in virtual server(s) running in a cloud-based computing environment rather than being tied to one or more specific physical network computing devices. Also, the application(s) may be running in one or more virtual machines (VMs) executing on the DIFD 202. Additionally, in one or more embodiments of this technology, virtual machine(s) running on the DIFD 202 may be managed or supervised by a hypervisor.

In the network environment 200 of FIG. 2, the DIFD 202 is coupled to a plurality of server devices 204(1)-204(n) that hosts a plurality of databases 206(1)-206(n), and also to a plurality of client devices 208(1)-208(n) via communication network(s) 210. A communication interface of the DIFD 202, such as the network interface 114 of the computer system 102 of FIG. 1, operatively couples and communicates between the DIFD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DIFD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like). Public Switched Telephone Network (PSTNs). Ethernet-based Packet Data Networks (PDNs), combinations thereof, and the like.

The DIFD 202 may be a standalone device or integrated with one or more other devices or apparatuses, such as one or more of the server devices 204(1)-204(n), for example. In one particular example, the DIFD 202 may be hosted by one of the server devices 204(1)-204(n), and other arrangements are also possible. Moreover, one or more of the devices of the DIFD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DIFD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DIFD 202 that may be configured for abstracting data processing constructs to developer friendly templates to accelerate development addressing key data integration architecture patterns and archetype (such as ETL, ELT. ETLT, streaming and lambda, etc.) with new and native development technology stacks, but the disclosure is not limited thereto. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the DIFD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DIFD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DIFD 202, the server devices 204(1)-204(n), or the client devices 208(1)-208(n), for example, may be configured to operate as virtual instances on the same physical machine. For example, one or more of the DIFD 202, the server devices 204(1)-204(n), or the client devices 208(1)-208(n) may operate on the same physical device rather than as separate devices communicating through communication network(s) 210. Additionally, there may be more or fewer DIFDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
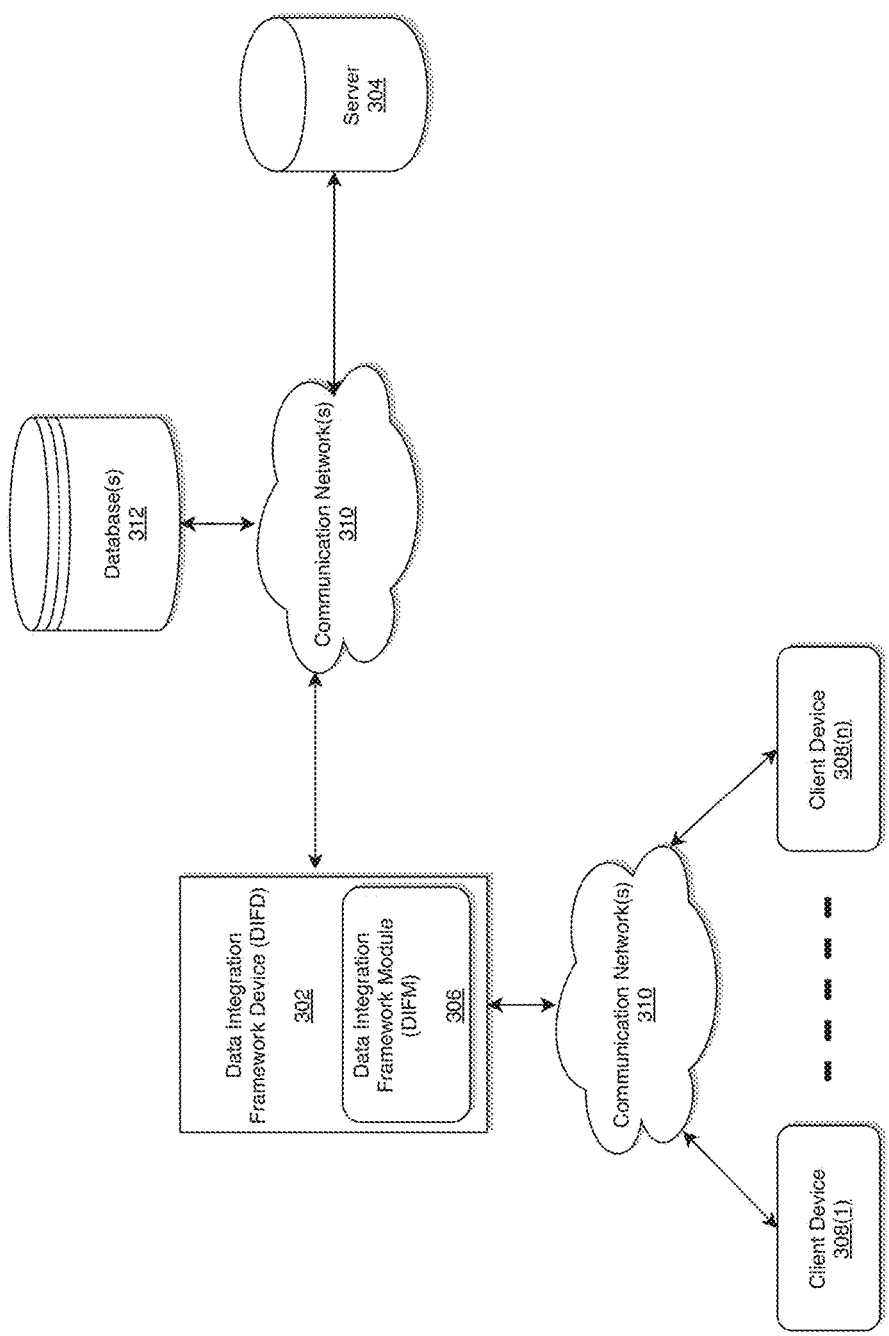
FIG. 3 illustrates a system diagram for implementing a data integration framework device with a data integration framework module in accordance with an exemplary embodiment.

FIG. 3 illustrates a system diagram for implementing a data integration framework device (DIFD) with a data integration framework module (DIFM) in accordance with an exemplary embodiment.

As illustrated in FIG. 3, the DIFD 302 including the DIFM 306 may be connected to a server 304, and database(s) 312 via a communication network 310. The DIFD 302 may also be connected to a plurality of client devices 308(1)-308(n) via the communication network 310, but the disclosure is not limited thereto.

According to exemplary embodiment, the DIFD 302 is described and shown in FIG. 3 as including the DIFM 306, although it may include other rules, policies, modules, databases, or applications, for example. According to exemplary embodiments, the database(s) 312 may be embedded within the DIFD 302. According to exemplary embodiments, the database(s) 312 may be configured to store information including: rules, programs, test cases, framework templates, etc., but the disclosure is not limited thereto. According to exemplary embodiments, the DIFM 306 may be configured to be storage platform agnostic—configured to be deployed across multiple storage layers (e.g., HDFS (Hadoop File System), S3); and Hadoop distribution agnostic. According to exemplary embodiments, the DIFM 306 may be configured to remove dependency on expensive ETL tools that are not native to Hadoop; adopt to an application toolchain (e.g., proprietary Chase DevOps toolchain owned by the Applicant) from ground up. According to exemplary embodiments, the DIFM 306 may also be configured to implement software assets more aligned with TDD (Test-Driven Development) and ATDD (Acceptance Test-Driven Development) practices with the framework enabling modem architecture, design and data processing/integration development and implement enabler for micro services architecture, designed for the clouds and container from ground up.

According to exemplary embodiments, the DIFM 306 may be configured to receive continuous feed of data from the database(s) 312 via the communication network 310.

As will be described below, the DIFM 306 may be configured to implement a data processing framework configured to run native on a big data platform; abstract data processing constructs to a user friendly template, thereby eliminating necessity of user initiated tasks of instantiating language level objects; implement a core set of data pipeline configurations on the template configured to initiate a chain of user defined data transformations; receive input of the chain of the user defined data transformations; test each transformation independently of each other; and outputting data integration solutions on the big data platform based on a positive test result, but the disclosure is not limited thereto.

The plurality of client devices 308(1)-308(n) are illustrated as being in communication with the DIFD 302. In this regard, the plurality of client devices 308(1)-308(n) may be "clients" of the DIFD 302 and are described herein as such. Nevertheless, it is to be known and understood that the plurality of client devices 308(1)-308(n) need not necessarily be "clients" of the DIFD 302, or any entity described in association therewith herein. Any additional or alternative relationship may exist between either or more of the plurality of client devices 308(1)-308(n) and the DIFD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the DIFD 302 via broadband or cellular communication. Of course, these embodiments are merely exemplary and are not limiting or exhaustive.

Figure 4:
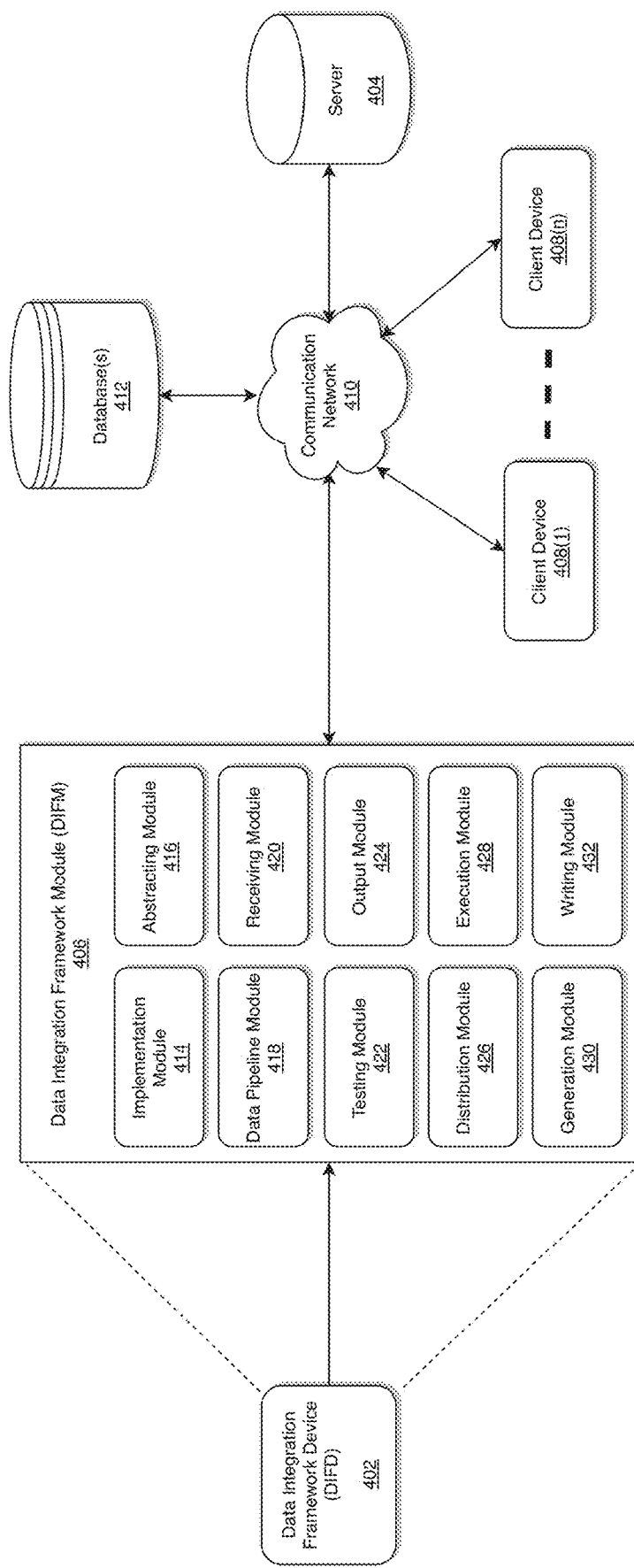
FIG. 4 illustrates a system diagram for implementing a data integration framework module of FIG. 3 in accordance with an exemplary embodiment.

FIG. 4 illustrates a system diagram for implementing a data integration framework module of FIG. 3 in accordance with an exemplary embodiment. As illustrated in FIG. 4, the system 400 may include a data integration framework device (DIFD) 402 within which a data integration framework module (DIFM) 406 may be embedded, database(s) 412, a server 404, client devices 408(1)-408(n), and a communication network 410. According to exemplary embodiments, the DIFD 402. DIFM 406, database(s) 412, the server 404, the client devices 408(1)-408(n), and the communication network 410 as illustrated in FIG. 4 may be the same or similar to the DIFD 302, DIFM 306, database(s) 312, the server 304, the client devices 308(1)-308(n), and the communication network 310, respectively, as illustrated in FIG. 3.

As illustrated in FIG. 4, the DIFM 406 may include an implementation module 414, an abstracting module 416, a data pipeline module 418, a receiving module 420, a testing module 422, an output module 424, a distribution module 426, an execution module 428, a generation module 430, and a writing module 432. According to exemplary embodiments, the database(s) 412 may be external to the DIFD 402 may include various systems that are managed and operated by an organization. Alternatively, according to exemplary embodiments, the database(s) 412 may be embedded within the DIFD 402 and/or the DIFM 406

The process may be executed via the communication network 410, which may comprise plural networks as described above. For example, in an exemplary embodiment, the various components of the DIFM 406 may communicate with the server 404, and the database(s) 412 via the communication network 410. Of course, these embodiments are merely exemplary and are not limiting or exhaustive.

According to exemplary embodiments, the communication network 410 may be configured to establish a link between the database(s) 412, the client devices 408(1)-408(n) and the DIFM 406.

According to exemplary embodiments, each of the implementation module 414, abstracting module 416, data pipeline module 418, receiving module 420, testing module 422, output module 424, distribution module 426, execution module 428, generation module 430, and writing module 432 may be implemented by microprocessors or similar, they may be programmed using software (e.g., microcode) to perform various functions discussed herein and may optionally be driven by firmware and/or software. Alternatively, each of the implementation module 414, abstracting module 416, data pipeline module 418, receiving module 420, testing module 422, output module 424, distribution module 426, execution module 428, generation module 430, and writing module 432 may be implemented by dedicated hardware, or as a combination of dedicated hardware to perform some functions and a processor (e.g., one or more programmed microprocessors and associated circuitry) to perform other functions. Also, according to exemplary embodiments, each of the implementation module 414, abstracting module 416, data pipeline module 418, receiving module 420, testing module 422, output module 424, distribution module 426, execution module 428, generation module 430, and writing module 432 may be physically separated into two or more interacting and discrete blocks, units, devices, and/or modules without departing from the scope of the inventive concepts.

Figure 5:
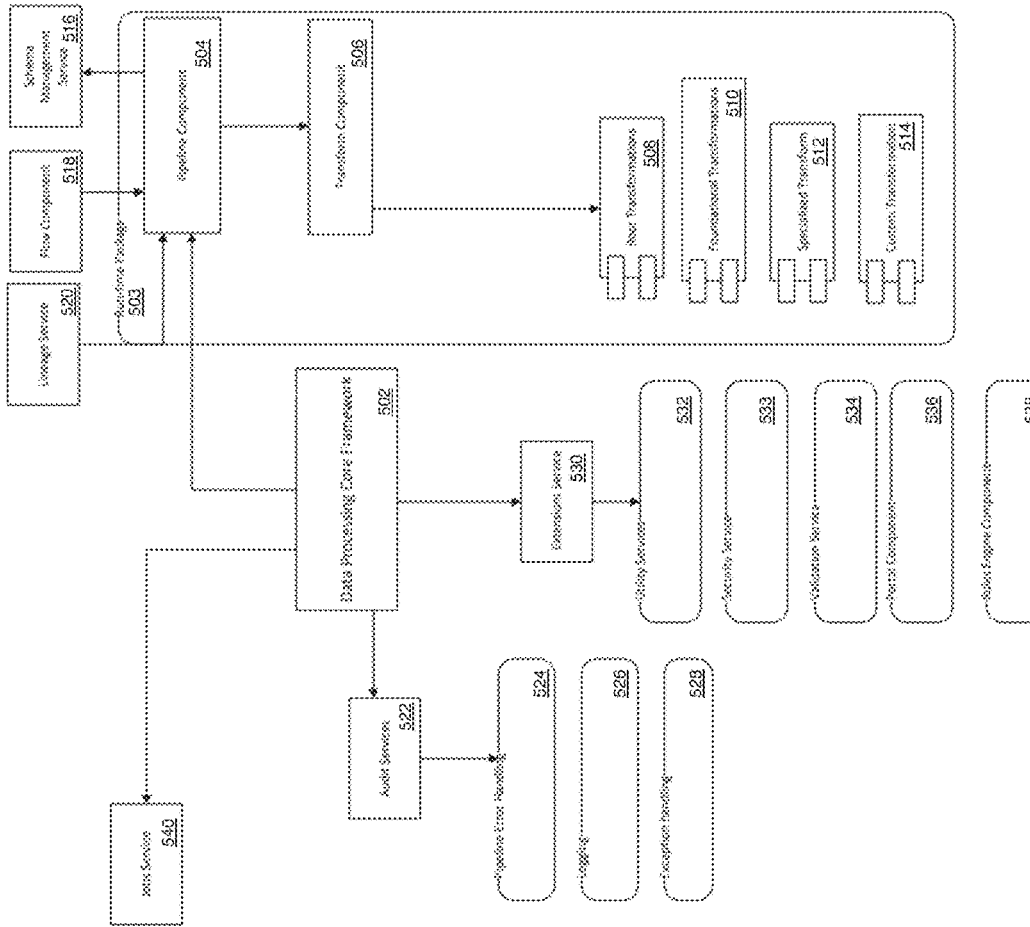
FIG. 5 illustrates a system diagram of an exemplary data processing core framework in accordance with an exemplary embodiment.
Figure 6:
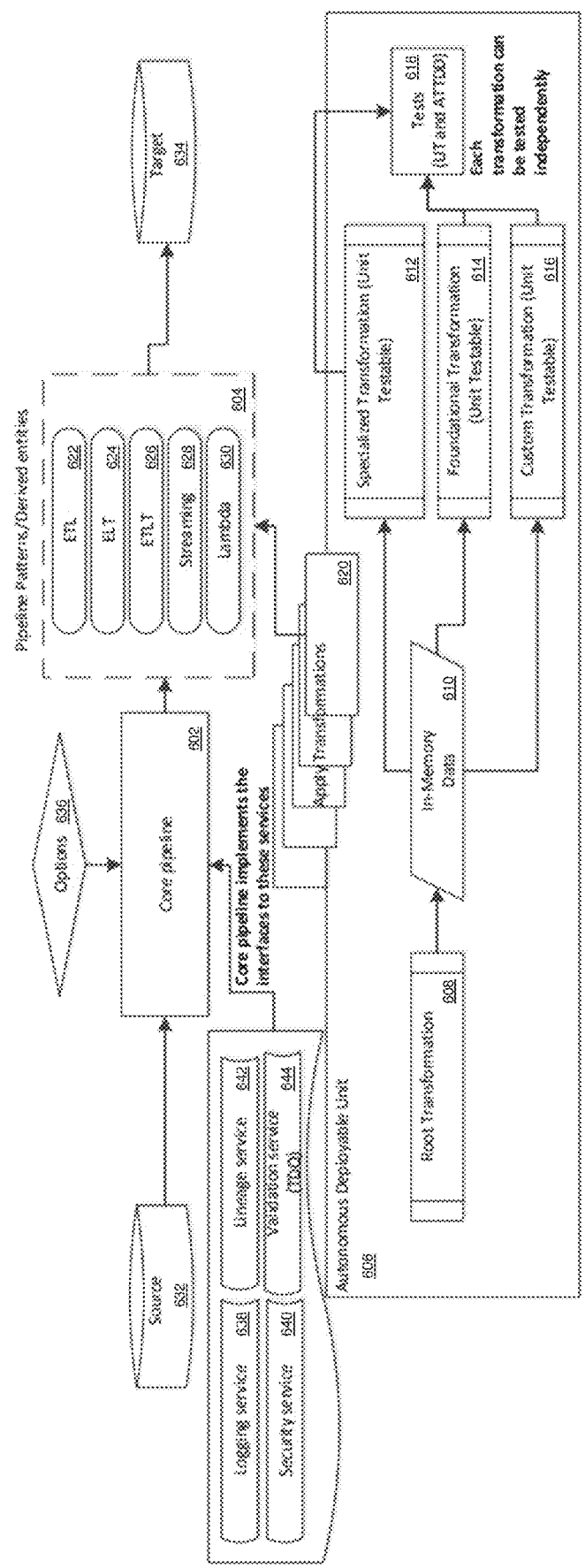
FIG. 6 illustrates an exemplary data processing path in accordance with an exemplary embodiment.
Figure 7:
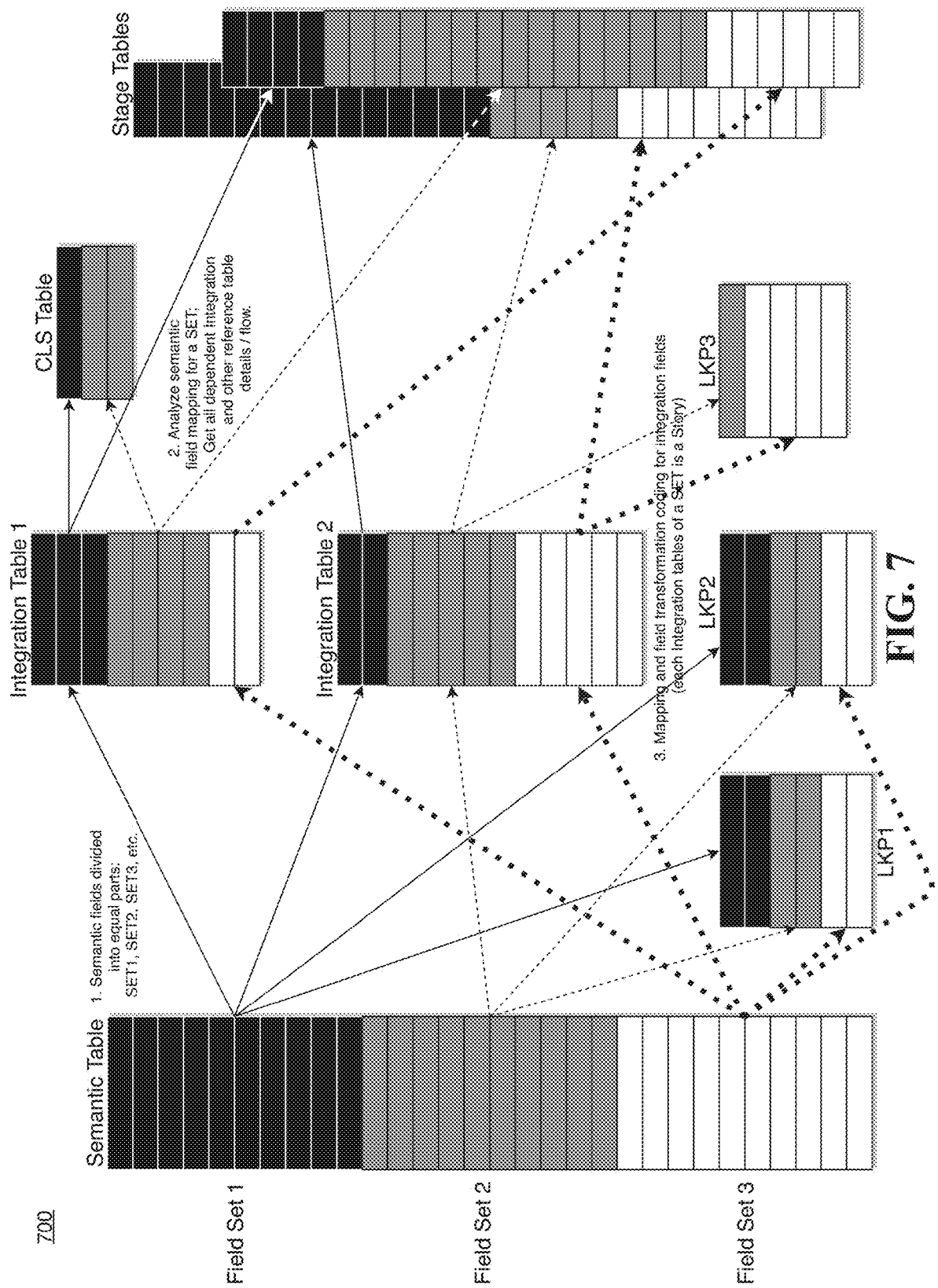
FIG. 7 illustrates an exemplary use case in accordance with an exemplary embodiment.

According to exemplary embodiments, FIG. 5 illustrates a system diagram of an exemplary data processing core framework in accordance with an exemplary embodiment, FIG. 6 illustrates an exemplary data processing path in accordance with an exemplary embodiment, and FIG. 7 illustrates an exemplary use case in accordance with an exemplary embodiment.

As illustrated in FIG. 5, the system 500 illustrates a data processing core framework 502 that is operatively connected with a pipeline component 504, audit services 522, extensions service 530, and jobs service 540. According to exemplary embodiments, the pipeline component 504 may be configured to operatively connect with a transform component 506, schema management service 516, a flow component 518 and a linage service 520. The transform component 506 may fetch data from one or more of the following transformations components, but the disclosure is not limited thereto: root transformations 508, foundational transformations 510, specialized transform 512, and custom transformation 514. According to exemplary embodiments, the features associated with pipeline component 504, transform component 506, root transformations 508, foundational transformations 510, specialized transform 512, and custom transformation 514 may be referred to as a run-time package 503.

According to exemplary embodiments, the audit service 522, extensions service 530, lineage service 520, flow component 518, schema management service 516, audit services 522, and jobs service 540 may be extensions or application programming interface (API) based consumption of peripheral services with respect to the data processing core framework 502.

According to exemplary embodiments, the audit services 522 may fetch data from one or more of the following audit services, but the disclosure is not limited thereto: pipeline error handling 524, logging 526, and exception handling 528.

According to exemplary embodiments, the extensions service 530 may fetch data from one or more of the following services, but the disclosure is not limited thereto: utility services 532, security service 533, validation service 534, portal component 536, and rules engine component 538.

As illustrated in FIG. 6, the exemplary data processing path 600, in accordance with an exemplary embodiment, may include a source 632, a core pipeline 602, pipeline patterns/derived entities 604, a target 634, an autonomous deployable unit 606, and options 636 (which is a determination unit). According to exemplary embodiments, the autonomous deployable unit 606 may include root transformation 608, in-memory data 610, specialized transformation (unit testable) 612, foundational transformation (unit testable) 614, custom transformation (unit testable) 616 and test (UT and ATTDD) 618.

According to exemplary embodiments, the core pipeline may implement the interfaces to the following services, but the disclosure is not limited thereto: logging service 638, lineage service 642, security service 640, and validation service (TDQ) 644.

FIG. 7 illustrates an exemplary use case in accordance with an exemplary embodiment. As illustrated in FIG. 7, in the exemplary use case 700, the DIFM 406 may be configured to divide a semantic table into equal parts, e.g., Field Set 1, Field Set 2, and Field Set 3 (in this example, each set including ten semantic fields), but the disclosure is not limited thereto. According to exemplary embodiments, after dividing the semantic table, semantic fields may be incorporated into integration tables and look up tables. For example, as illustrated in FIG. 7, integration table 1 may include three semantic fields from Field Set 1, four semantic fields from Field Set 2, and two semantic fields from Field Set 3; integration table 2 may include two semantic fields from Field Set 1, five semantic fields from Field Set 2, and five semantic fields from Field Set 3; look up table LKP1 may include two semantic fields from Field Set 1, two semantic fields from Field Set 2, and two semantic fields from Field Set 3; and look up table LKP2 may include two semantic fields from Field Set 1, two semantic fields from Field Set 2, and two semantic fields from Field Set 3.

According to exemplary embodiments, the DIFM 406 may be configured to analyze semantic field mapping for a field set and get all dependent integration and other reference table details/flow. In addition, according to exemplary embodiments, the DIFM 406 may be configured to map and field transformation code for integration fields (each Integration tables of a SET is a Story). For example, as illustrated in FIG. 7, the CLS table may include one semantic filed from Field Set 1 and two semantic fields from Field Set 2 obtained from integration table 1; look up table LKP3 may include one semantic filed from Field Set 2 and four semantic fields from Field Set 3 obtained from the integration table 1. The stage tables, according exemplary embodiments as illustrated in FIG. 7 may be formed by incorporating data from remaining semantic fields of the integration table 1 and integration table 2.

Referring to FIGS. 4-7, according to exemplary embodiments, the implementation module 414 may be configured to implement a data processing framework (e.g., a data processing core framework 502) configured to run native on a big data platform. According to exemplary embodiments, the big data platform may be a framework that is configured for distributed processing of large data sets across clusters of computers using simple programming models as illustrated in FIGS. 4-7.

According to exemplary embodiments, the abstracting module 416 may be configured to abstract data processing constructs to a user friendly template, thereby eliminating necessity of user initiated tasks of instantiating language level objects.

According to exemplary embodiments, the implementation module 414 may be further configured to implement a core set of data pipeline configurations (see, e.g., FIGS. 5-6) on the template configured to initiate a chain of user defined data transformations (e.g., root transformation 508, 608; foundational transformation 510, 614; specialized transformation 512, 612, and custom transformation 514, 616).

According to exemplary embodiments, the receiving module 420 may be configured to receive input of the chain of the user defined data transformations (e.g., root transformation 508, 608; foundational transformation 510, 614; specialized transformation 512, 612, and custom transformation 514, 616).

According to exemplary embodiments, the testing module 422 may be configured to test each transformation independently of each other; and the output module 424 may be configured to output data integration solutions on the big data platform based on a positive test result to the target 634.

According exemplary embodiments, the distribution module 426 and the execution module 428 may be configured to divide the data processing framework into one or more of the following transformations: (e.g., root transformation 508, 608; foundational transformation 510, 614; specialized transformation 512, 612, and custom transformation 514, 616).

According to exemplary embodiments, the implementation module 414 may be configured to implement code data transformation services as part of the data processing framework.

According to exemplary embodiments, the data processing framework may be configured to be deployed across multiple storage layers, but the disclosure is not limited thereto.

According to exemplary embodiments, the data processing framework may be a standalone product having standalone library configured to be deployed across multiple storage layers, but the disclosure is not limited thereto.

According to exemplary embodiments, the data processing framework may be Java deployable.

According to exemplary embodiments, the implementation module 414 may be configured to implement an abstraction layer on the data processing framework; the receiving module 420 may be configured to receive a master file and subsequently receiving a new file; the generation module 430 may be configured to generate data corresponding to a delta value from a difference between the master file and the new file based on predefined parameters; the receiving module 420 may be configured to receive input for applying data processing functions on the generated data corresponding to the delta value; and the output module may be configured to output data integration solutions on the big data platform based on the data processing functions.

According to exemplary embodiments, the data processing framework may include a data processing core framework 502 that is configured to access an audit service 522 and an extension service 530 to generate the data integration solutions as data transformation results.

As illustrated in FIG. 5, according to exemplary embodiments, the audit service 522 may include one or more of the following services: pipeline error handling service 524, logging service 526, and exception handling service 528, but the disclosure is not limited thereto.

According to exemplary embodiments, as illustrated in FIG. 5, the extension service 530 may include one or more of the following services: utility services 532, security service 533, validation service 534, portal component 536, and rules engine component 538, but the disclosure is not limited thereto.

According to exemplary embodiments, the data processing core framework 502 may be configured to: access, by utilizing the data pipeline module 418, a pipeline component 504 that is configured to receive data from a data lineage service component (e.g., lineage service 520 as illustrated in FIG. 5 or lineage service 642 as illustrated in FIG. 6) and a data flow component (e.g., flow component 518 as illustrated in FIG. 5); and output, by utilizing the output module 424, data to a schema management service component (e.g., schema management service 516 as illustrated in FIG. 5) and a transform component 506. As illustrated in FIGS. 5-6, according to exemplary embodiments, the transform component may include one or more of the following transformation component: root transformation 508,608; foundational transformation 510, 614; specialized transformation 512, 612, and custom transformation 514, 616, but the disclosure is not limited thereto.

According to exemplary embodiments, for all functions, the generation module 430 may be configured to generate an empty template of user acceptance testing; the abstracting module 416 may be configured to abstract domain specific language in SQL (structured query language) corresponding to the testing; and the writing module 432 may be configured to write all codes within the template based on the abstracted domain specific language.

According to exemplary embodiments, a non-transitory computer readable medium may be configured to store instructions for integrating data. According to exemplary embodiments, the instructions, when executed, may cause a processor embedded within the DIFM 406 or the DIFD 402 to perform the following: implementing a data processing framework configured to run native on a big data platform; abstracting data processing constructs to a user friendly template, thereby eliminating necessity of user initiated tasks of instantiating language level objects; implementing a core set of data pipeline configurations on the template configured to initiate a chain of user defined data transformations; receiving input of the chain of the user defined data transformations; testing each transformation independently of each other; and outputting data integration solutions on the big data platform based on a positive test result. The processor may be the same or similar to the processor 104 as illustrated in FIG. 1 or the processor embedded within DIFD 202, DIFD 302, DIFM 306, DIFD 402, and DIFM 406.

According to exemplary embodiments, the instructions, when executed, may further cause the processor 104 to perform the following: implementing code data transformation services as part of the data processing framework.

According to exemplary embodiments, the instructions, when executed, may further cause the processor 104 to perform the following: providing an abstraction layer on the data processing framework; receiving a master file and subsequently receiving a new file; generating data corresponding to a delta value from a difference between the master file and the new file based on predefined parameters; receiving input for applying data processing functions on the generated data corresponding to the delta value; and outputting data integration solutions on the big data platform based on the data processing functions.

According to exemplary embodiments, the instructions, when executed, may further cause the processor 104 to perform the following: dividing the data processing framework into one or more of the following transformations: root transformation, foundational transformation, specialized transformation, and custom transformation; and testing each transformation independently of each other.

According to exemplary embodiments, the instructions, when executed, may further cause the processor 104 to perform the following: access a pipeline component that is configured to receive data from a data lineage service component and a data flow component; and output data to a schema management service component and a transform component, wherein the transform component includes one or more of the following transformation component: root transformation component, foundational transformation component, specialized transformation component, and custom transformation component.

According to exemplary embodiments, the instructions, when executed, may further cause the processor 104 to perform the following: generating an empty template of user acceptance testing; abstracting domain specific language in SQL (structured query language) corresponding to the testing; and writing all codes within the template based on the abstracted domain specific language.

Figure 8:
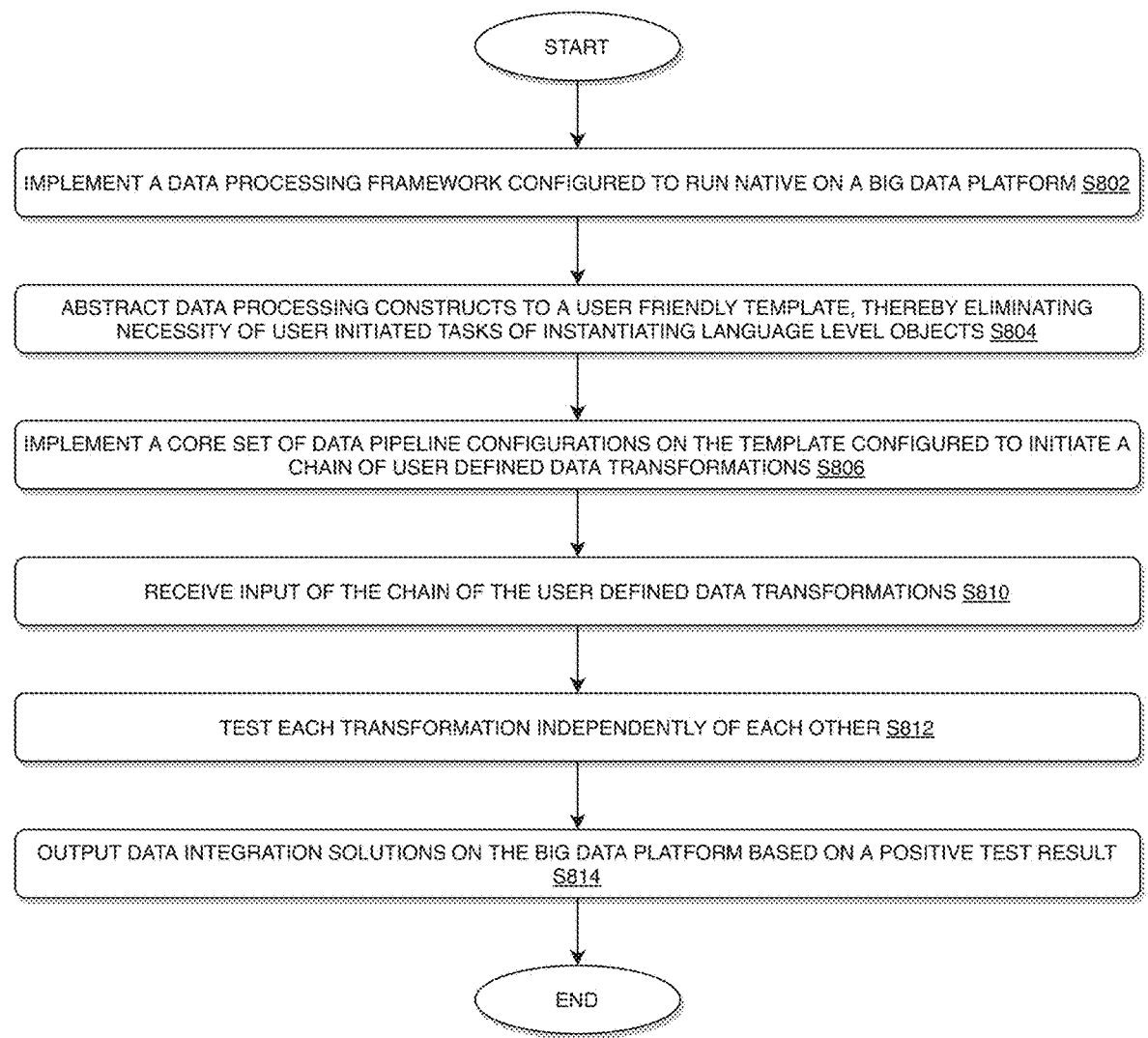
FIG. 8 illustrates a flow chart for implementing a data integration framework module in accordance with an exemplary embodiment.

FIG. 8 illustrates a flow chart for implementing a data integration framework module for integrating data by utilizing one or more processors and one or more memories in accordance with an exemplary embodiment.

In the process 800 of FIG. 8, at step S802, a data processing framework may be implemented that is configured to run native on a big data platform. At step S804, data processing constructs may be abstracted to a user friendly template, thereby eliminating necessity of user initiated tasks of instantiating language level objects. At step S806, a core set of data pipeline configurations may be implemented on the template configured to initiate a chain of user defined data transformations. At step S810, input of the chain of the user defined data transformations may be received. At step S812, each transformation may be tested independently of each other. At step S514, data integration solutions may be outputted on the big data platform based on a positive test result.

According to exemplary embodiments, the process 800 may further include: implementing code data transformation services as part of the data processing framework.

According to exemplary embodiments, the process 800 may further include: providing an abstraction layer on the data processing framework; receiving a master file and subsequently receiving a new file; generating data corresponding to a delta value from a difference between the master file and the new file based on predefined parameters; receiving input for applying data processing functions on the generated data corresponding to the delta value; and outputting data integration solutions on the big data platform based on the data processing functions.

According to exemplary embodiments, the process 800 may further include: dividing the data processing framework into one or more of the following transformations: root transformation, foundational transformation, specialized transformation, and custom transformation; and testing each transformation independently of each other.

According to exemplary embodiments, the process 800 may further include: access a pipeline component that is configured to receive data from a data lineage service component and a data flow component; and output data to a schema management service component and a transform component, wherein the transform component includes one or more of the following transformation component: root transformation component, foundational transformation component, specialized transformation component, and custom transformation component.

According to exemplary embodiments, the process 800 may further include: generating an empty template of user acceptance testing; abstracting domain specific language in SQL (structured query language) corresponding to the testing; and writing all codes within the template based on the abstracted domain specific language.

According to exemplary embodiments as disclosed above in FIGS. 1-8, technical improvements effected by the instant disclosure may include platforms for implementing a data integration framework module for providing a core set of data pipeline capabilities configured to initiate a chain of user or developer defined data transformations, thereby increasing developer productivity when writing big data native data integration solutions by accelerating and improving time to market and augmenting developer skills and replacing vendor based data processing product with an organic capability, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for integrating data by utilizing one or more processors and one or more memories, the method comprising:
implementing a data processing framework configured to run native on a big data platform;
abstracting data processing constructs to a user friendly template, thereby eliminating necessity of user initiated tasks of instantiating language level objects;
implementing a core set of data pipeline configurations on the template configured to initiate a chain of user defined data transformations;
receiving input of the chain of the user defined data transformations;
testing each transformation independently of each other;
outputting data integration solutions on the big data platform based on a positive test result;
implementing an abstraction layer on the data processing framework;
receiving a master file and subsequently receiving a new file;
generating data corresponding to a delta value from a difference between the master file and the new file based on predefined parameters;
applying data processing functions based on received input on the generated data corresponding to the delta value; and
outputting data integration solutions on the big data platform based on the data processing functions.

2. The method according to claim 1, wherein the big data platform is a framework that is configured for distributed processing of large data sets across clusters of computers using simple programming models.

3. The method according to claim 1, further comprising: implementing code data transformation services as part of the data processing framework.

4. The method according to claim 1, wherein the data processing framework is configured to be deployed across multiple storage layers.

5. The method according to claim 1, wherein the data processing framework is a standalone product having standalone library configured to be deployed across multiple storage layers.

6. The method according to claim 1, wherein the data processing framework is JAVA deployable.

7. The method according to claim 1, further comprising: dividing the data processing framework into one or more of the following transformations: root transformation, foundational transformation, specialized transformation, and custom transformation; and testing each transformation independently of each other.

8. The method according to claim 1, wherein the data processing framework includes a data processing core framework that is configured to access an audit service and an extension service to generate the data integration solutions as data transformation results.

9. The method according to claim 8, wherein: the audit service includes one or more of the following services: pipeline error handling service, logging service, and exception handling service; and the extension service includes one or more of the following services: utility services, security service, validation service, portal component and rules engine component.

10. The method according to claim 8, wherein the data processing core framework is configured to: access a pipeline component that is configured to receive data from a data lineage service component and a data flow component; and output data to a schema management service component and a transform component, wherein the transform component includes one or more of the following transformation component: root transformation component, foundational transformation component, specialized transformation component, and custom transformation component.

11. The method according to claim 1, wherein for all functions, the method further comprising: generating an empty template of user acceptance testing; abstracting domain specific language in SQL (structured query language) corresponding to the testing; and writing all codes within the template based on the abstracted domain specific language.

12. A system for integrating data, comprising:
a memory and a processor operatively connected to the memory via a communication network, wherein the processor is configured to:

implement a data processing framework configured to run native on a big data platform;

abstract data processing constructs to a user friendly template, thereby eliminating necessity of user initiated tasks of instantiating language level objects;

implement a core set of data pipeline configurations on the template configured to initiate a chain of user defined data transformations;

receive input of the chain of the user defined data transformations;

test each transformation independently of each other;

output data integration solutions on the big data platform based on a positive test result;

implement an abstraction layer on the data processing framework;

receive a master file and subsequently receiving a new file;

generate data corresponding to a delta value from a difference between the master file and the new file based on predefined parameters;

apply data processing functions based on received input on the generated data corresponding to the delta value; and output data integration solutions on the big data platform based on the data processing functions.

13. The system according to claim 12, wherein the big data platform is a framework that is configured for distributed processing of large data sets across clusters of computers using simple programming models.

14. The system according to claim 12, wherein the processor is further configured to: divide the data processing framework into one or more of the following transformations: root transformation, foundational transformation, specialized transformation, and custom transformation; and test each transformation independently of each other.

15. The system according to claim 12, wherein the data processing framework includes a data processing core framework that is configured to access an audit service and an extension service to generate the data integration solutions as data transformation results.

16. The system according to claim 15, wherein: the audit service includes one or more of the following services: pipeline error handling service, logging service, and exception handling service; and the extension service includes one or more of the following services: utility services, security service, validation service, portal component and rules engine component.

17. The system according to claim 16, wherein the processor is further configured to: access a pipeline component that is configured to receive data from a data lineage service component and a data flow component; and output data to a schema management service component and a transform component, wherein the transform component includes one or more of the following transformation component: root transformation component, foundational transformation component, specialized transformation component, and custom transformation component.

18. The system according to claim 12, wherein for all functions, the processor is further configured to: generate an empty template of user acceptance testing; abstract domain specific language in SQL (structured query language) corresponding to the testing; and write all codes within the template based on the abstracted domain specific language.

19. A non-transitory computer readable medium configured to store instructions for integrating data, wherein when executed, the instructions cause a processor to perform the following:

implementing a data processing framework configured to run native on a big data platform;

abstracting data processing constructs to a user friendly template, thereby eliminating necessity of user initiated tasks of instantiating language level objects;

implementing a core set of data pipeline configurations on the template configured to initiate a chain of user defined data transformations;

receiving input of the chain of the user defined data transformations;

testing each transformation independently of each other;

outputting data integration solutions on the big data platform based on a positive test result;

implementing an abstraction layer on the data processing framework;

receiving a master file and subsequently receiving a new file;

generating data corresponding to a delta value from a difference between the master file and the new file based on predefined parameters;

applying data processing functions based on received input on the generated data corresponding to the delta value; and outputting data integration solutions on the big data platform based on the data processing functions.

* * * * *